Dec. 13, 1960    E. O. RIEDEL    2,964,187
PLATE SIEVE STRUCTURE AND METHOD OF PRODUCING SAME
Filed Feb. 13, 1958    5 Sheets-Sheet 1

INVENTOR
ERICH O. RIEDEL by: Eric D. Frankel
PATENT AGENT

Dec. 13, 1960 E. O. RIEDEL 2,964,187
PLATE SIEVE STRUCTURE AND METHOD OF PRODUCING SAME
Filed Feb. 13, 1958 5 Sheets-Sheet 2

INVENTOR
ERICH O. RIEDEL

By: *Eric O. Frankel*
PATENT AGENT

Dec. 13, 1960  E. O. RIEDEL  2,964,187
PLATE SIEVE STRUCTURE AND METHOD OF PRODUCING SAME
Filed Feb. 13, 1958  5 Sheets-Sheet 4

INVENTOR
ERICH O. RIEDEL
by: Eric D. Frankel
PATENT AGENT

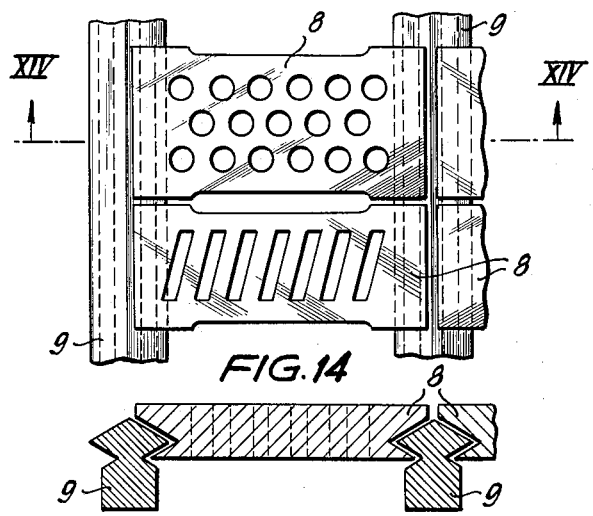
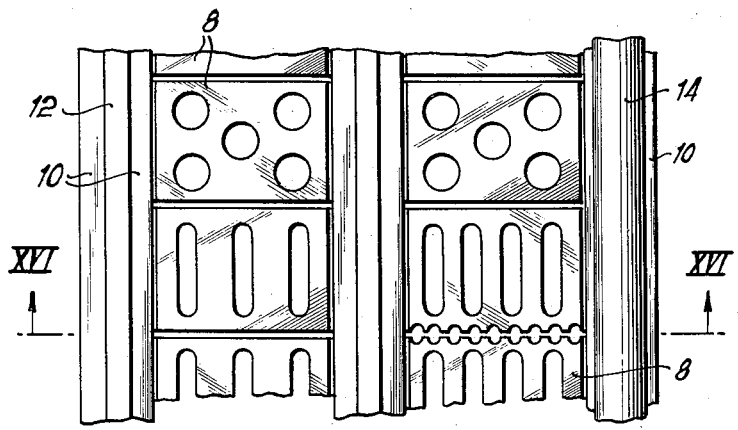
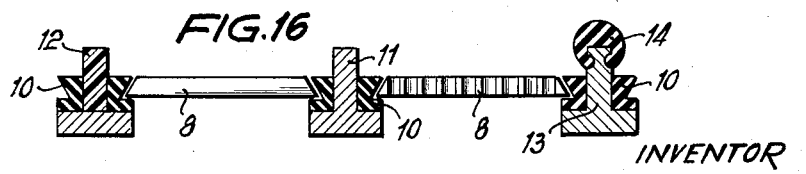

United States Patent Office 2,964,187
Patented Dec. 13, 1960

2,964,187

PLATE SIEVE STRUCTURE AND METHOD OF PRODUCING SAME

Erich O. Riedel, Gruiten, Kreis, Dusseldorf-Mettmann, Germany, assignor to Rosenthal-Isolatoren G.m.b.H., Selb, Bavaria, Germany Filed Feb. 13, 1958, Ser. No. 715,057

Claims priority, application Germany Feb. 20, 1957

6 Claims. (Cl. 209—392)

This invention relates to a plate sieve structure, especially for screening machines and centrifuges, and method of producing same.

In the technique of screening and centrifuging, so-called perforated sheets or plate sieve bottoms are preferred on account of their simplicity, their homogeneous bond and the facility with which they can be fitted in the machine. The prerequisites for every sieve bottom are high efficiency and durability. The efficiency is dependent upon the ratio of perforated area to unperforated area of the sieve to which limits are set, because hard and/or corrosion-resisting materials offer to punching a resistance which, particularly in the case of fine perforations, only allows so-called wide spaced perforation, that is the distance between the apertures must be greater than is normally appropriate. This results in a decrease in the perforated area of the sieve surface so that the working capacity, which is directly proportional thereto, drops. This same resistance to punching also has an unfavorable effect on the durability, because the thickness of the sieve bottom must theoretically not exceed the diameter of aperture. The thickness of the sieve bottom, however, almost exclusively determines the durability. Consequently, a compromise must be drawn between capacity as function of the perforated area of the sieve surface and durability as function of the thickness of the sieve. This circumstance has heretofore prevented the introduction of highly wear-resistant materials whose suitability for screening purposes is unquestionable.

Attempts to avoid these objections have been confined chiefly to the introduction of so-called split sieves, which are only used reluctantly on account of their heavy weight, lack of precision and because they are difficult to fit, and to special perforating processes which slightly improve the relationship between aperture diameter and thickness of plate. These perforating processes, however, mostly do not produce a circular or slot-shaped hole, such as is necessary for the accurate separation of the materials to be treated. Therefore their field of use is restricted.

Moreover, multiple layer perforated sheets are known, which consist of a wear-resistant metal sheet mounted on a support which is inferior as regards its resistance to wear. This combination is, however, again subject to the interrelationship which applies generally for the ratio between size of aperture and thickness of plate. Also in the case of lattice or grid sieve bottoms a process is known which combines wear-resistant materials with inferior materials.

An object of the present invention is to utilize highly wear-resistant hard ceramics or sintered metals for screening purposes, which heretofore did not generally come into question for such purposes because their lack of elasticity and their unsuitability for perforating frustrated every attempt in this direction.

Another object of the invention is to produce sieve structures which comprise a plurality of shaped bodies made of highly wear-resistant material and interconnected in mosaic fashion by adhesive or plastic substances in such a manner that gaps are left free between the individual shaped bodies so as to allow the substances located thereunder to be easily removed for the purpose of forming the sieve apertures. The invention brings such and other materials regarded as particularly resistant to wear but not considered as capable of being perforated by normal means, into a favorable spatial shape so that it is possible to use them as material for sieves or screens. At the same time it is possible to shape the sieve apertures so that they are conical in the screening direction, thereby reducing their resistance to the passage of the material being screened.

To attain a particularly favorable anchorage between the wear-resistant bodies, it has been found advantageous to provide the bodies on their side faces with interengaging profiles, any gaps forming due to the tolerances not being sufficiently observed or due to intentional undertolerances, being filled with embedding materials. If the shaped bodies are fitted together so that a substantially rectilineal, profiled edge is formed on either side of the bodies, this edge can advantageously be used for connection with interposed profiled mounting strips to form a sieve assembly.

When the sieve is subject to special dynamic stresses produced by the material being screened, that is, for example, in the case of great accelerations and/or when the material contains large grain lumps, it has been found advantageous to extend the profiled mounting strips above the actual surface of the sieve so as to take up the impact energy of the coarser grain contents. To prevent the coarser grain components from breaking when striking against the portions of the profiled mounting strips projecting above the surface of the sieve, these portions of the strips may be provided with a covering of elastic material.

It has also been found practical to interpose between the profiled mounting strips and the sieve assembly intermediate layers or fillets of elastic material with the object of damping shocks and vibrations.

Several preferred embodiments of the invention are hereinafter described by way of example with reference to the accompanying drawings, in which Fig. 1 is a fragmentary top plan view of a sieve structure composed of hexagonal shaped bodies;

Fig. 13 is a top plan view showing different shaped bodies slipped on mounting strips;

Fig. 14 is a section on line XIV—XIV of Fig. 13;

Fig. 15 is a top plan view of an arrangement of shaped bodies between upwardly extended strips, and Fig. 16 is a section on line XVI—XVI of Fig. 15.

Similar parts are designated by the same reference characters throughout the drawings.

As shown in these drawings, shaped bodies 1, 2 of wear-resistant material are interconnected by an adhesive substance 3 and, if desired, a backing or supporting plate 4 may be employed in addition. However, in many cases the backing 4 may be omitted and the structure formed by the wear-resisting bodies and adhesive substance will be rigid enough to be used in a screening or similar machine. By suitably selecting and arranging the shaped bodies any kind of sieve hole necessary for screening and sieve holes extending in any desired direction can be obtained. The latter is particularly important in the case of sieves for centrifuges because there the direction of the slots should be in the direction of discharge.

Figure 1:
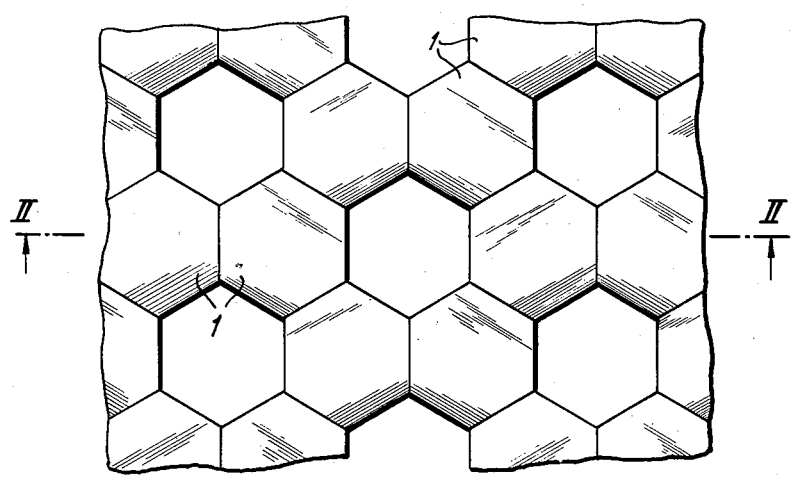
Figure 2:
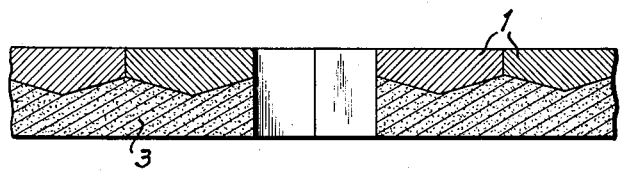
Fig. 2 is a section on line II—II of Fig. 1.
Figure 3:
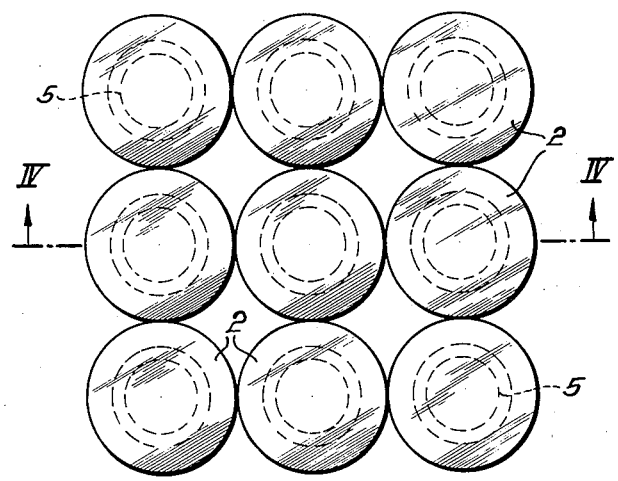
Fig. 3 is a top plan view of a sieve structure composed of circular shaped bodies.
Figure 4:
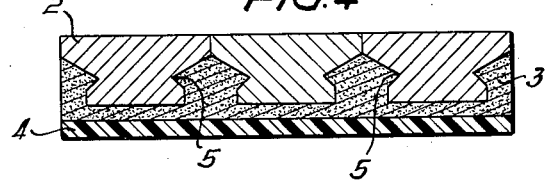
Fig. 4 is a section on line IV—IV of Fig. 3.
Figure 5:
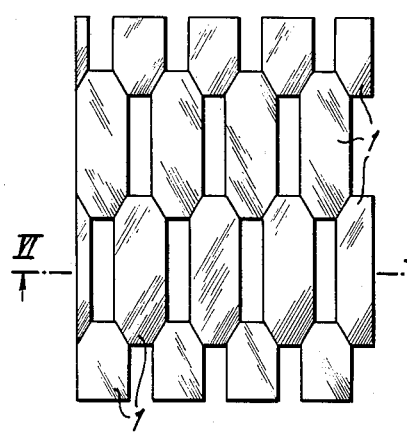
Fig. 5 is a top plan view of a sieve structure composed of elongated shaped bodies.
Figure 8:
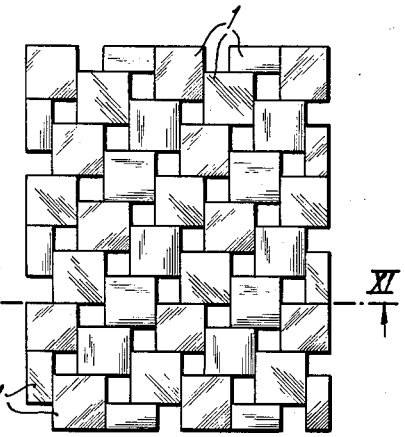
Fig. 8 is a top plan view of a sieve structure composed of mutually displaced square shaped bodies.
Figure 6:
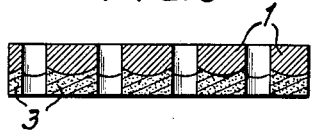
Fig. 6 is a section taken on line VI—VI of Fig. 5.
Figure 9:
Fig. 9 is a section on line XI—XI of Fig. 8.
Figure 7:
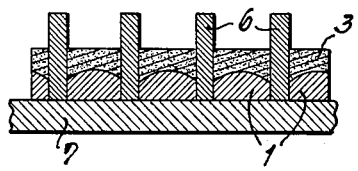
Fig. 7 is a section showing the sieve structure of Fig. 6 during assembly on a supporting plate with spacing elements.
Figure 10:
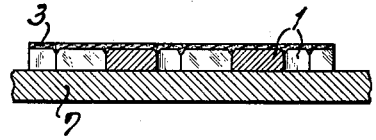
Fig. 10 is a section showing the sieve structure of Fig. 9 during assembly on a supporting plate and with a layer of adhesive or plastic substance of comparatively small thickness.
Figure 11:
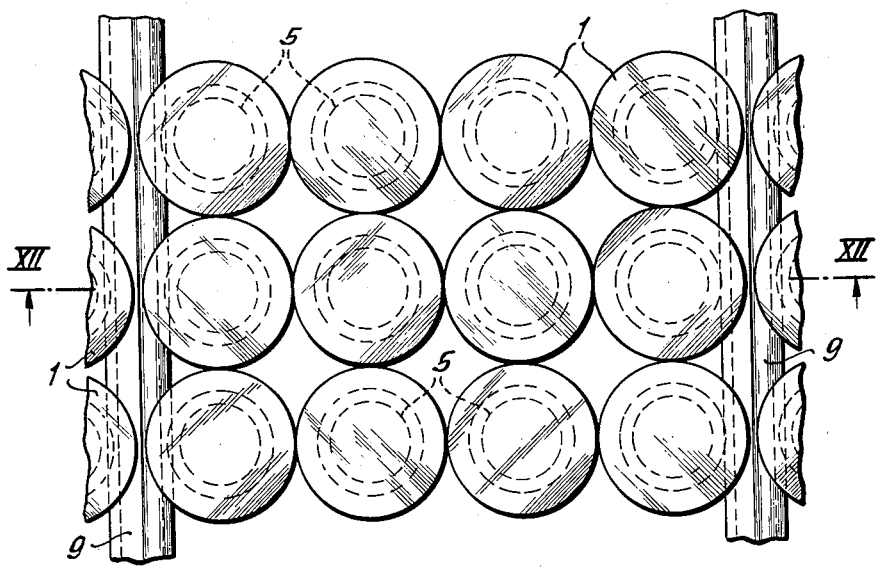
Fig. 11 is a top plan view of an assembly of wear-resistant bodies inserted between mounting strips.
Figure 12:
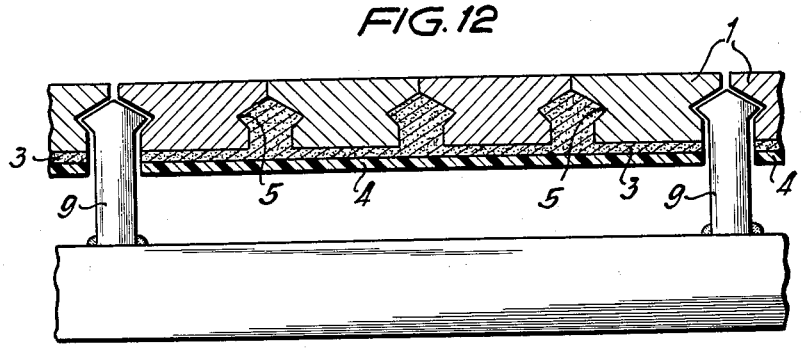
Fig. 12 is a section on line XII—XII of Fig. 11.

When employing the combination of adhesive 3 and supporting plate 4, the production of the sieve can be facilitated if both the adhesive and also the supporting plate consist of thermoplastic material, because it is then possible to clear the spaces between the wear-resistant bodies with a suitably shaped heated rod after the adhesive bond has set. But previously perforated supporting plates may also be used. It has been found advantageous to use as a support member a plate produced in the form of an expanded or meshed metal because the adhesive sticks firmly in the apertures and rough places of the plate. The smaller the wear-resistant body is the less the static and dynamic forces become apparent to a disadvantageous extent. Finally, it is also possible to shape the wear-resistant bodies with a constriction or recessed portion 5, as shown in Figs. 4 and 12. In this case the adhesive mass may be replaced by a nonadhesive plastic substance, because the anchorage is effected primarily by the special shaping of the wear-resistant bodies. As shown in Fig. 7, the sieve structure can be assembled or built-up on a support 7 and the shape and size of the sieve apertures determined by intermediate pieces or spacers 6. This assembly is subsequently filled up on the rear side with the plastic or adhesive material 3 to the necessary and desired thickness. After the material 3 has set, the sieve structure can be removed from the support 7 and spacers 6 and is then ready for use. The spacers may be heated to facilitate the removal of the sieve structure. The spacers 6 can be dispensed with if the wear-resistant bodies are made with sufficient accuracy.

If sieve bottoms are to be made having relatively large sieve holes it is also possible to fit the shaped bodies together so that a complete body or unit built-up from several separate bodies serves for forming the web surfaces between the holes. For so-called baffle or impact surfaces it is also possible to set shaped bodies one against the other so as to form an unbroken surface without apertures. Thus wear-resistant bodies of uniform sizes can be used for producing fine, medium and coarse sieve bottoms.

Figs. 11 to 16 illustrate how such built-up sieve plates or units are fixed for use in a screening machine or the like.

As shown in Figs. 13 and 14, separate wear-resistant bodies 8 can be set up in a row between mounting strips or supporting rails 9. The individual wear-resistant bodies 8 may themselves be provided with apertures or have moldings or recesses on their edges which form apertures when the bodies are fitted together. According to requirements the wear-resistant bodies may either be rigidly mounted between the strips 9, for example by cementing, or elastic intermediate layers may be provided between the edges of the bodies and the mounting strips.

Figs. 15 and 16 show a special type of intermediate layer constructed as rubber corner fillet 10 with undercut, permitting the shaped bodies to be merely pressed into the plane of the sieve from above.

If shaped bodies sensitive to percussion and bending are to be used for screening coarse material with a large range of grain sizes, the mounting strips are extended in upward direction. They may be constructed as plain shaped or profiled strips 11, as elastic strips 12 or as shaped strips 13 with an elastic covering 14.

The present invention enables for the first time highly wear-resistant and therefore brittle materials to be used in the construction of sieve bottoms for screening and centrifuging machines, with the result that the life of the sieve bottoms is considerably prolonged. New fields are opened up for screening and centrifuging which were hitherto not economical on account of wear. Moreover the capacity of the machines is increased because, besides the fact that the individual sieve holes may be of conical or tapered shape and consequently offer but slight resistance to the passage of the material, it is possible to make the sieve holes almost in any shape and in any direction. Finally, the ratio of perforated area to unperforated area of the screen surface is particularly favorable. Thus, a considerable advance in the field of perforated sieve bottoms is attained with the possibility of achieving unexpected screening and centrifuging effects for materials which heretofore could not be treated at all or only with extreme difficulty.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

I claim:

1. A plate sieve structure comprising, a plurality of shaped bodies of wear-resistant material positioned with respect to one another to define a plurality of sieve openings, a supporting plate upon which said shaped bodies are adapted to be assembled, a plastic substance interconnecting said plurality of shaped bodies to one another so as to be substantially lying in a common plane, said supporting plate being provided with apertures overlying at least said sieve openings.

2. A plate sieve structure as set forth in claim 1, wherein the plastic substance is an adhesive.

3. A plate sieve structure as set forth in claim 1, wherein the plastic substance forms an intermediate layer between the shaped bodies and the supporting layer.

4. A plate sieve structure as set forth in claim 1, wherein the shaped bodies are recessed for anchorage in the plastic substance.

5. A plate sieve structure as set forth in claim 1, wherein said shaped bodies are mounted on said supporting plate in a uniform pattern.

6. A method of producing plate sieve structures, comprising the steps of placing a plurality of shaped bodies of wear-resistant material on a layer of a plastic substance, separating said shaped bodies by spacer elements extending through said layer of plastic substance, allowing said plastic substance to set and subsequently removing said spacer elements to form sieve apertures extending through said layer of plastic substance.

References Cited in the file of this patent

UNITED STATES PATENTS

| Number | Name | Date |
| --- | --- | --- |
| 957,187 | Chappell | May 10, 1910 |
| 1,132,047 | Thompson | Mar. 16, 1915 |
| 1,220,232 | Jackson | Mar. 27, 1917 |
| 1,718,385 | Sherwood | June 25, 1929 |
| 1,925,460 | Pegram | Sept. 5, 1933 |
| 2,150,889 | Colville | Mar. 14, 1939 |
| 2,284,883 | Symons | June 2, 1942 |
| 2,374,775 | Parks | May 1, 1945 |

FOREIGN PATENTS

| Number | Country | Date |
| --- | --- | --- |
| 19,998 | Great Britain | 1897 |